(12) United States Patent
Pendergraft

(10) Patent No.: US 6,486,445 B1
(45) Date of Patent: Nov. 26, 2002

(54) VACUUM CAST CERAMIC FIBER INSULATED BAND HAVING HEATING AND COOLING ELEMENTS

(76) Inventor: Gordon M. Pendergraft, 6417 S. 39th West Ave., Tulsa, OK (US) 74132

( * ) Notice: Subject to any disclaimer, the term of this patent is extended or adjusted under 35 U.S.C. 154(b) by 0 days.

(21) Appl. No.: 09/704,130

(22) Filed: Nov. 1, 2000

Related U.S. Application Data

(60) Provisional application No. 60/164,065, filed on Nov. 4, 1999.

(51) Int. Cl.[7] .......................... B29C 45/20; B29C 45/74; H05B 3/16; H05B 3/44
(52) U.S. Cl. .................... 219/424; 219/422; 222/146.5; 425/549; 264/328.5
(58) Field of Search ................................ 219/422, 424, 219/426, 521, 544, 548; 222/146.5; 425/547, 549; 264/328.14, 328.15

(56) References Cited

U.S. PATENT DOCUMENTS

| | | | |
|---|---|---|---|
| 3,577,589 A | | 5/1971 | Serrano .................. 18/125 M |
| 3,619,329 A | | 11/1971 | Wright ........................ 156/500 |
| 3,727,678 A | | 4/1973 | Schott, Jr. ...................... 165/64 |
| 4,040,845 A | | 8/1977 | Richerson et al. .......... 106/38.9 |
| 4,249,877 A | | 2/1981 | Machen ....................... 425/204 |
| 4,478,516 A | | 10/1984 | Kessler ......................... 366/87 |
| 4,492,556 A | * | 1/1985 | Crandell ..................... 425/549 |
| 4,541,792 A | | 9/1985 | Zakic ......................... 425/143 |
| 4,548,341 A | * | 10/1985 | Hambleton .............. 222/146.5 |
| 4,635,851 A | * | 1/1987 | Zecman ....................... 425/549 |
| 4,642,043 A | * | 2/1987 | Schwarzkopf ............... 425/547 |
| 4,792,242 A | * | 12/1988 | Loman .................... 264/328.14 |
| 4,828,020 A | * | 5/1989 | Guhl et al. .................. 219/535 |
| 4,958,770 A | | 9/1990 | Mitchell ...................... 239/145 |
| 5,051,086 A | * | 9/1991 | Gellert ........................ 425/549 |
| 5,180,594 A | * | 1/1993 | Trakas ......................... 425/547 |
| 5,200,205 A | | 4/1993 | Wissmann et al. .......... 425/200 |
| 5,397,515 A | * | 3/1995 | Searle et al. ............ 264/328.14 |
| 5,543,092 A | * | 8/1996 | Ibar ....................... 264/328.14 |
| 5,647,425 A | | 7/1997 | Foutz et al. ................... 164/54 |
| 5,816,742 A | | 10/1998 | Cordewener ................. 405/43 |
| 5,820,900 A | | 10/1998 | McGrevy ..................... 425/549 |
| 5,955,120 A | * | 9/1999 | Deissler ...................... 425/547 |

FOREIGN PATENT DOCUMENTS

| | | | |
|---|---|---|---|
| DE | 4429816 | * | 2/1996 |
| GB | 2278262 | * | 11/1994 |

* cited by examiner

Primary Examiner—Joseph Pelham
(74) Attorney, Agent, or Firm—Head, Johnson and Kachigian

(57) ABSTRACT

A ceramic fiber band that can fulfill a plurality of functions in connection with the injection and/or extrusion process of an injection molding or extrusion apparatus (i.e. heat, cool, and insulate), thereby reducing overall energy costs and creating a safer working environment. The ceramic band, being an insulator and having heating and/or cooling elements with a faster response contained therein, exert the desired heating/cooling effect upon the barrel portion of the injection/extrusion machine thereby raising, lowering, or maintaining the temperature of the fluid plastic compound passing through the barrel.

14 Claims, 5 Drawing Sheets

VACUUM CAST CERAMIC FIBER INSULATED BAND HAVING HEATING AND COOLING ELEMENTS

REFERENCE OF PENDING APPLICATIONS

This application claims the benefit of Provisional Patent Application No. 60/164,065, filed on Nov. 4, 1999 and entitled A VACUUM CAST CERAMIC FIBER INSULATED BAND HAVING HEATING AND COOLING ELEMENTS.

REFERENCE TO MICROFICHE APPENDIX

This application is not referenced in any microfiche appendix.

BACKGROUND OF THE INVENTION

1. Field of the Invention

The present invention relates generally to vacuum cast ceramic fiber insulators, specifically those having the ability to raise, lower or maintain temperature by utilizing heating and/or cooling controls in a low temperature apparatus.

2. Prior Art

The use of injection/extrusion machines to create plastic parts is well known. Plastic compounds are subjected to heat in order to render it into a fluid state. After it reaches a fluid state, the compound is then forced under pressure into mold cavities or through dies. It is well known in the art that the fluid resin compounds are directed into the mold cavities or dies by way of injection or extrusion barrels. In order to insure the optimum flow characteristics of the compound, the barrels are equipped with heating mechanisms in order to control the temperature of the compound. Multiple types of heating bands have been disclosed in the prior art. The most common is the heating coil that surrounds the barrel and conducts heat to the compound as it flows through the barrel.

The optimization of the flow characteristics of the fluid compound is dependent upon the ability to control the amount of heat applied to the barrel as the fluid compound passes through it. Therefore, an improved heating and cooling mechanism is needed to improve the efficiency in the attempt to achieve the optimal flow characteristics for the fluid compound.

The present invention is directed to a ceramic insulating and heating/cooling band. The prior art does not demonstrate the use of such bands with low temperature apparatus, in the range of less than 1000° C./1600° F. Thus, there is a need for a temperature control mechanism for use in low temperature apparatus, such as injection/extrusion machines.

BRIEF SUMMARY OF THE INVENTION

The present invention is generally directed toward a device for effectively insulating while heating and/or cooling a fluid plastic compound more efficiently. Specifically, the present invention is directed toward a device having the ability to maximize the controllability of the temperature of a fluid plastic compound in connection with the injection/extrusion process of low temperature apparatus, such injection molding and extrusion machines A discussion concerning specific terms used herein is in order. The term "ceramic band" is synonymously referred to as a vacuum cast ceramic fiber heater band, machinable ceramic fiber board or other materials of the ceramic genre. While extrusion machines can be different from injection molding machines, the present invention can be utilized in connection with both types of machines. Therefore, reference to one type of machine should be viewed as reference to both types of machines. The use of the terms "low temperature" and "low temperature apparatus" herein refers to those apparatus which cannot obtain temperatures of 1000° C./1600° F. and higher.

The present invention utilizes a ceramic band which surrounds the barrel of the injection/extrusion machine. The ceramic band acts as an insulator for the heat contained on and within the barrel. Further, the ceramic band incorporates heating elements and cooling mechanisms to provide the ability to accurately and quickly change the temperature of the barrel.

The heating/cooling mechanisms can be, but not necessarily, cast within the ceramic band providing an efficient temperature control unit.

The ceramic band can take a plurality of different forms, including but not limited to a half-section configuration or individual block configuration. In any configuration, the band fits around the exterior portion of the barrel and provides a heating and/or cooling effect to such barrel, thereby heating or cooling the fluid plastic compound flowing through such barrel.

With respect to the heating mechanisms, standard heating elements are cast within the ceramic band. With respect to the cooling mechanisms, air or fluid can be utilized to decrease the temperature of the barrel. Suitable apparatus for providing air or fluid cooling ability is provided through a manifold apparatus either in the interior or on the exterior of the ceramic band.

In addition, monitoring devices such as LED lights, can be utilized to monitor the present invention and advise the operator its current operational condition.

The primary objective of the present invention is to provide a self-insulated heating and cooling unit used in connection with low temperature plastics injection/extrusion machines.

Another object of the present invention is to provide a device which insulates and provides improved temperature controllability for the barrel portion of injection and extrusion machines.

Another object of the present invention is to provide a faster responding device utilizing insulation, heating elements and air and/or water cooling devices to alter the controlled temperature of the barrel portion of injection and extrusion machines.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
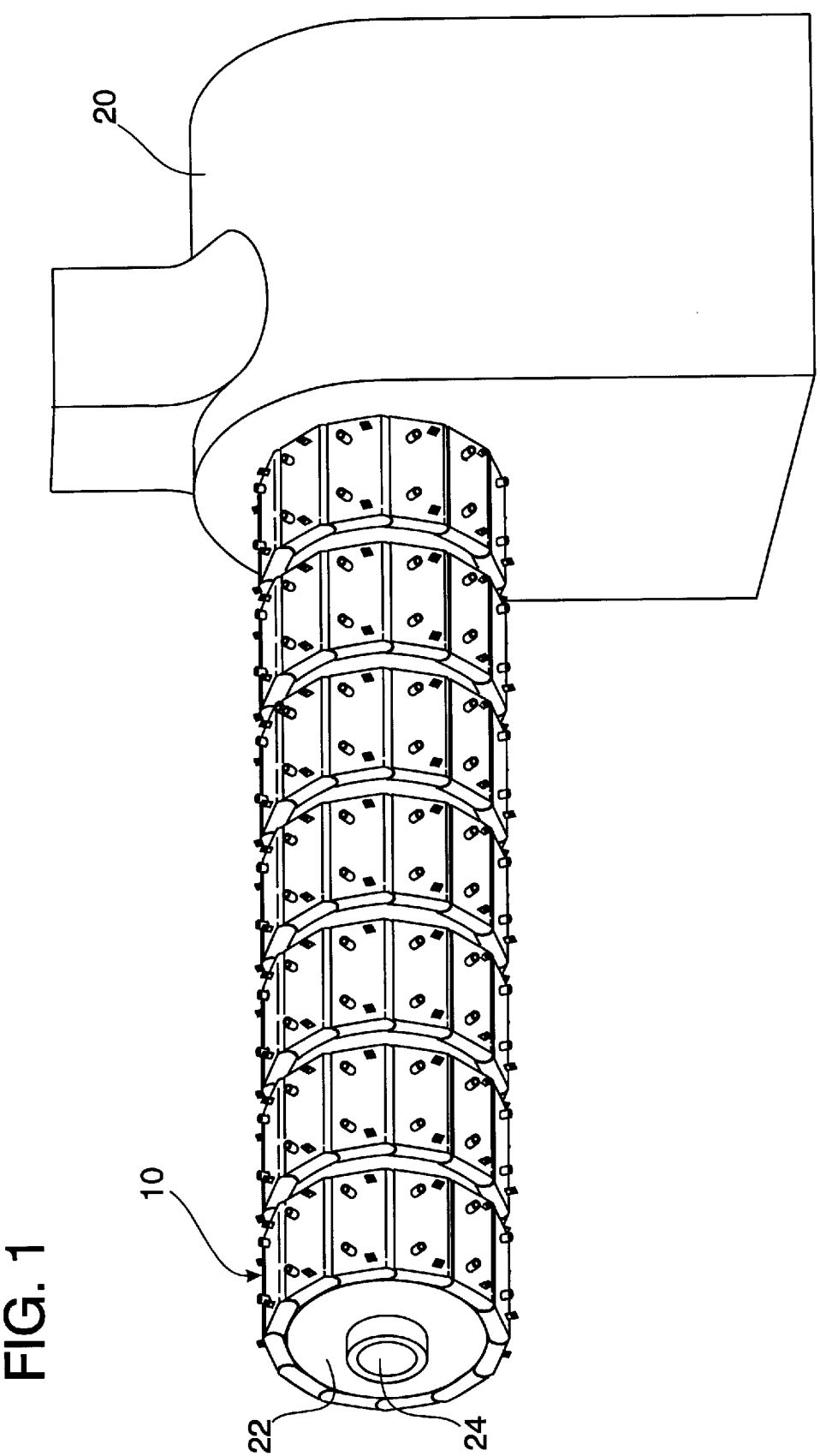
FIG. 1 is a perspective view of the present invention in connection with an injection machine.
Figure 2:
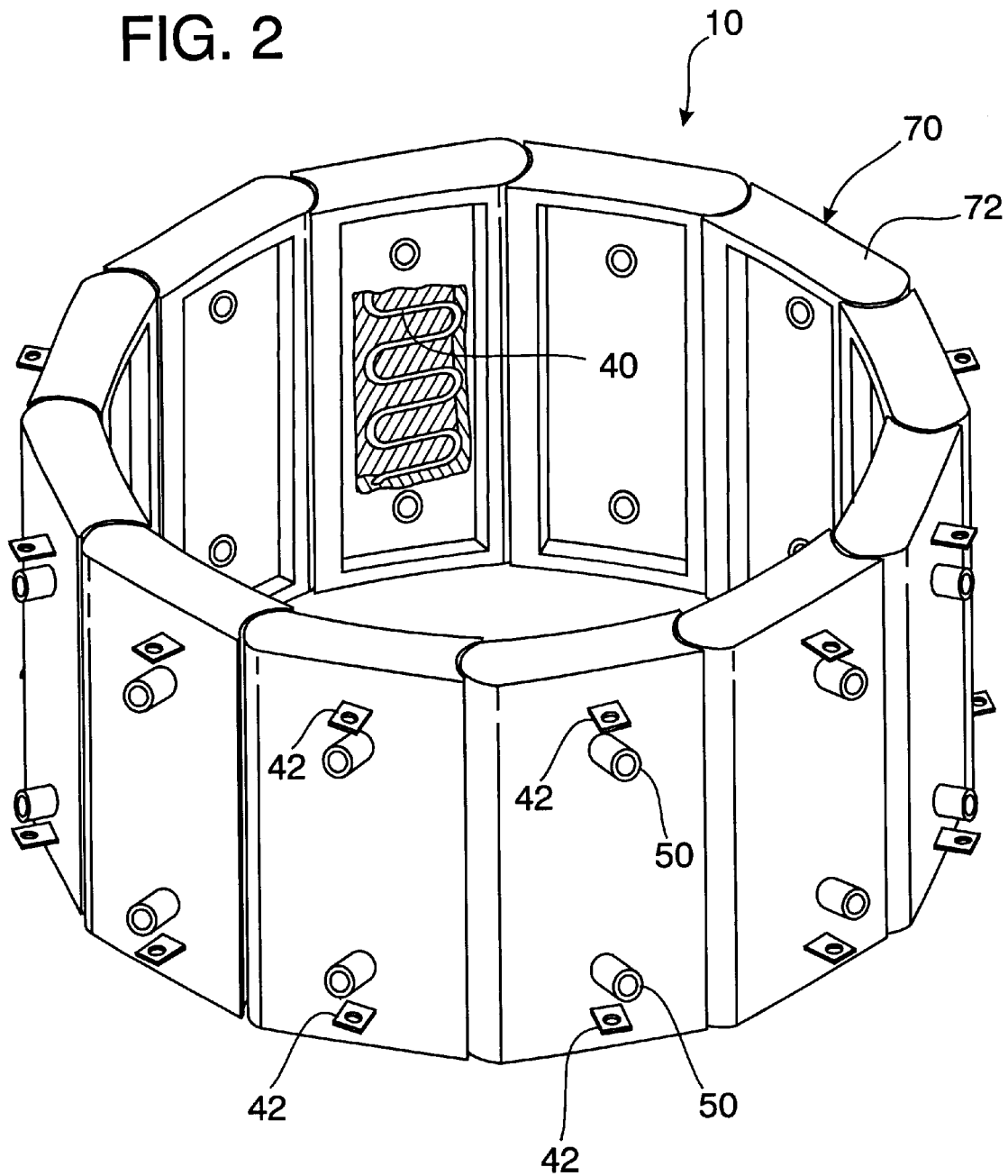
FIG. 2 is a perspective view of the present invention in a block configuration.
Figure 3:
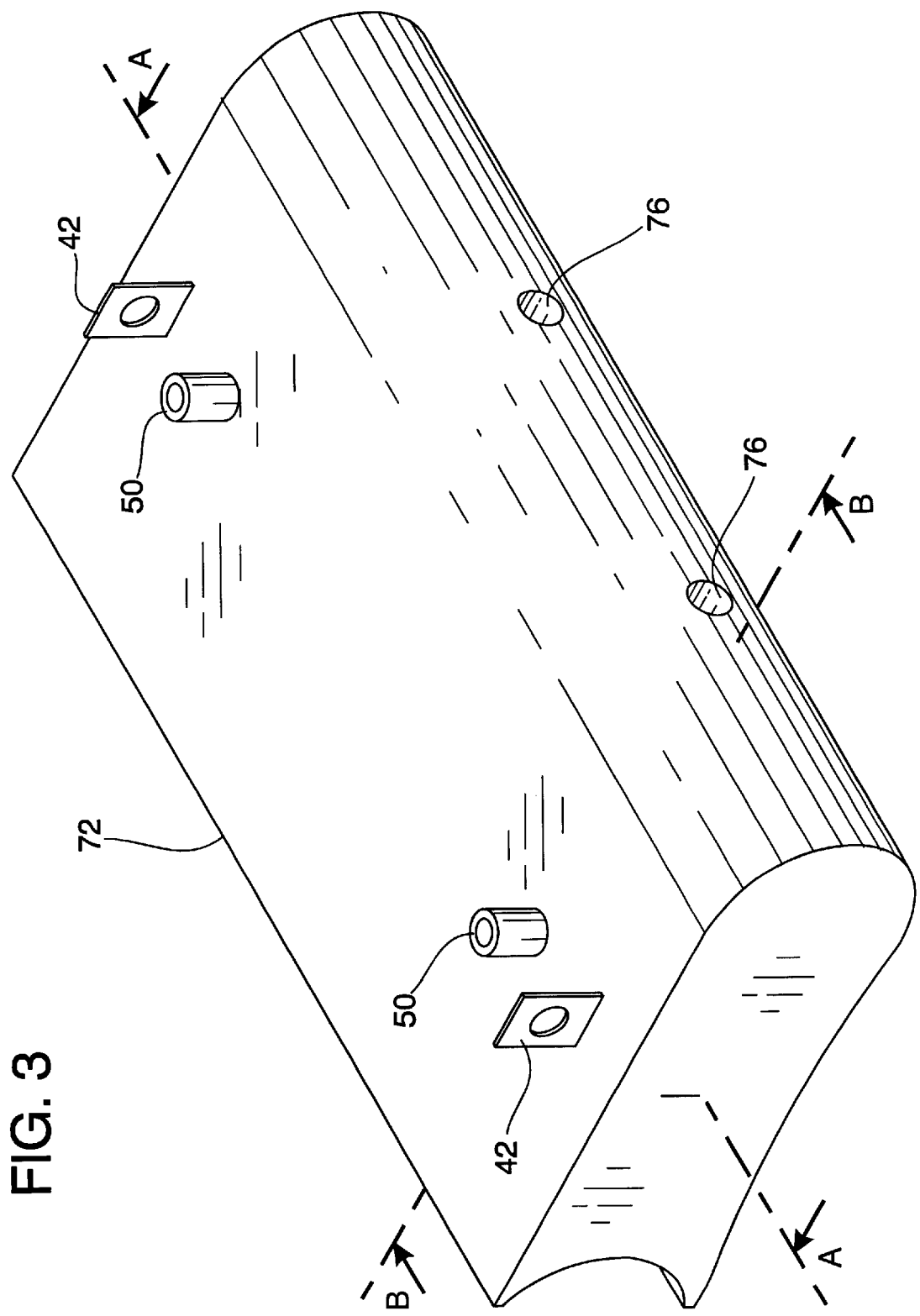
FIG. 3 is a perspective view of an individual block of the present invention.

Referring now to the figures, a preferred embodiment of the present invention is generally shown. As generally shown in the figures, a band 10 encases the barrel 22 portion of a liquid resin machine 20 in order to provide an insulation effect as well as efficiently controlling the temperature of liquid plastic flowing through the barrel 22. Machine 20 can be any type of machine that prepares resin for molding or otherwise shaping. Such machines include, but are not limited to, plastic injection mold or extrusion machine.

In the formation of plastic parts, the raw materials which make up plastic are mixed and prepared within a machine 20. During the mixing process, the components are heated into a flowable state. The flowable plastic material travels through the barrel 22 portion of machine 20 into a desired mold or through a desired extrusion die.

During this process, in order to maintain a highest level of quality with respect to the flowable plastic material, the ability to maintain control over material's temperature is critical. The preferred embodiment of the present invention utilizes a band 10 to encase barrel 22, wherein band 10 is made of a an insulating material along with heating and cooling elements cast within the band 10. The heating/cooling elements provide the ability to accurately and quickly change the temperature of barrel 22 which in turn modifies the temperature of material as it travels through passageway 24 of barrel 22. Passageway 24 is sometimes known as the "screw" cavity portion of barrel 22. Typically band 10 is made of a vacuum cast ceramic fiber material, however, it is understood that other compatible material is within the scope and spirit of this invention.

As further shown in the figures, heating element 40 which is embedded within band 10 and produces a heating effect directed toward barrel 22. Typically, heating element 40 is a standard heating element having electrical connection means 42 which are capable of producing desired levels of heat. However, it is understood that other compatible heating means capable of producing desired levels of heat are within the scope and spirit of this invention.

The preferred embodiment of the present invention incorporates a band 10 which utilizes a band of blocks 70 which completely encases barrel 22 as shown in the figures. The band of blocks 70 is made of a plurality of conduit blocks 72 and is secured by a securing means 74. Securing means 74 can be a rope made out of a high temperature resistant material or similar type of securing means and connects each block 70 through a connection conduit 76. Conduit block 72 contains heating elements 40 and coolant elements 50. In the preferred embodiment of this type of band, conduit block has an exterior surface 80 and an interior surface 82 with interior surface 82 having recess 84 and which rests against barrel 22.

Heating elements 40 are located below the surface of recess 84. This positioning protects the elements from damage and excessive wear while allowing the element to provide heat to barrel 22.

Figure 4:
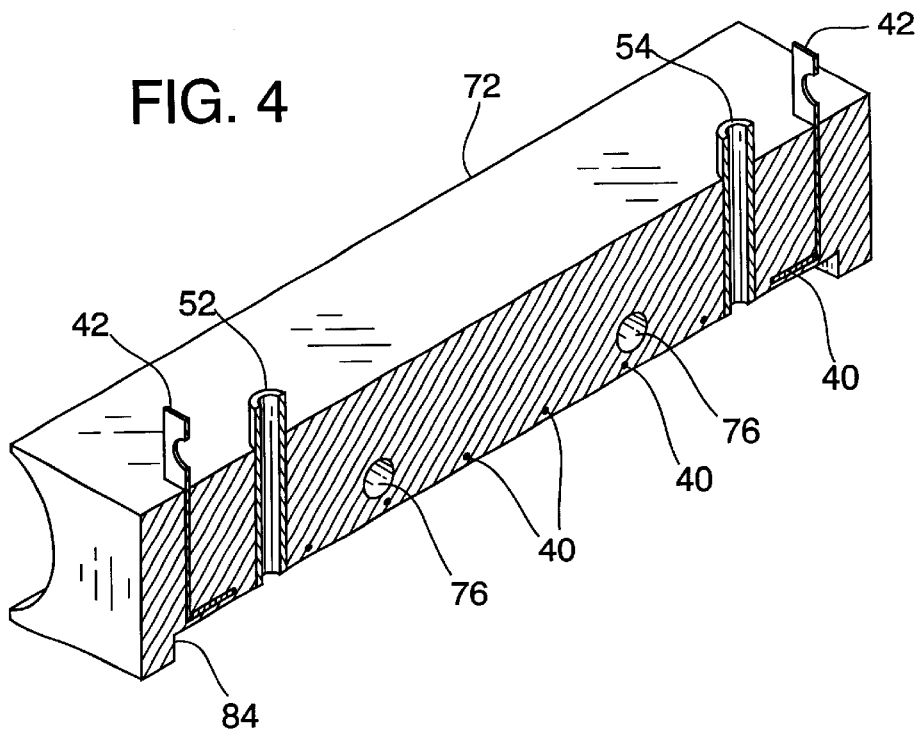
FIG. 4 is a cross-sectional view of the present invention as shown in FIG. 3 along line A—A.
Figure 5:
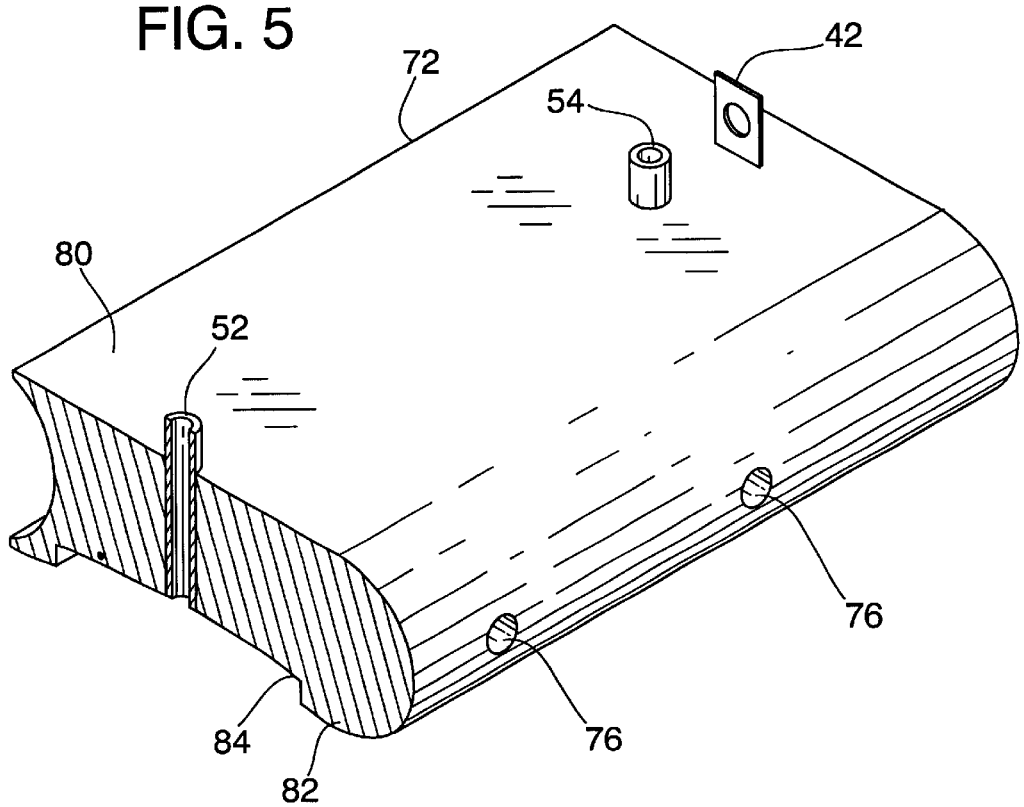
FIG. 5 is a cross-sectional view of the present invention as shown in FIG. 3 along line B—B.

In the preferred embodiment, two cooling elements are utilized. In FIGS. 4 and 5, they are referred to as a first cooling element 52 and a second cooling element 54. The number of cooling elements is, however, not limited to two as this number is for illustrative purposes.

Both elements 52 and 54 create a passage from the exterior of block 72 to the recess 84 of the block 72. In operation, air and/or liquid is inserted through element 52 into recess 84 the air and/or liquid fill the cavity created by recess 84. The air and/or liquid then exits through element 54. The process is a continuous one causing a cooling effect to be exerted upon barrel 22.

Cooling element 50 is cast within heater band 10 and provides a cooling effect along barrel 22. Cooling element 50 can utilize air or liquid to reduce the temperature of barrel 22, thus reducing the temperature of the flowable plastic material flowing there through. A manifold apparatus, which can be cast within heater band 10 or positioned along the exterior of heater band 10, provide air or liquid to cooling element 50.

Around heater band 10 is placed a protective covering which can be placed to encase the entire apparatus. Further, since the temperatures can be extremely high, heater band 10 acts as an insulator in order to absorb most of the temperature being emitted from barrel 22 as flowable plastic material passes there through.

In operation, a control device (not shown) is in communication with band 10 which is capable of determining if the temperature of material is at an acceptable level, and if not, whether material should be heated or cooled. If heating or cooling is to take place, this control signally communicates a command to band 10 in order to increase or decrease the heat on barrel 22. Once band 10 receives this command, it either heats or cools barrel 22 by initiating either heating element 40 or cooling element 50.

A monitoring device (not shown) can be attached to the present invention which determines if the flowable plastic material is maintaining a desired temperature. This device is capable of alerting the present invention of an increase or decrease in material temperature in order for the present invention to activate either heating element 40 or cooling element 50. When used in a manual operational setting, monitoring lights, such as LED lights, can be utilized to advise the operator of the injection/extrusion machine of the status of the present invention. When used in an automatic operational setting, the device can be in communication with a computer system which can automatically activate either hearing element 40 or cooling element 50, if necessary.

The preferred embodiment is shown in operation as follows. The band of blocks 70 of band 10 are positioned along the outer parameter of barrel 22. It is assumed the length of barrel 22 is encased by one unit of band 10. It is understood that multiple units can be utilized in order to completely encase the barrel. As flowable plastic material passes through the passageway 24 of barrel 22, it is monitored for desired temperature. In the event the temperature needs to be increased, heating element 40 is activated which provides a heating effect directed toward barrel 22. In the event the temperature of flowable plastic material needs to be decreased, the cooling element 50 is engaged. In the event cooling element 50 utilized air, band 10 would be equipped with an air coolant entrance 56 and an air coolant exit 58. Heat from barrel 22 is removed from barrel 22 through common thermodynamic principles.

Figure 6:
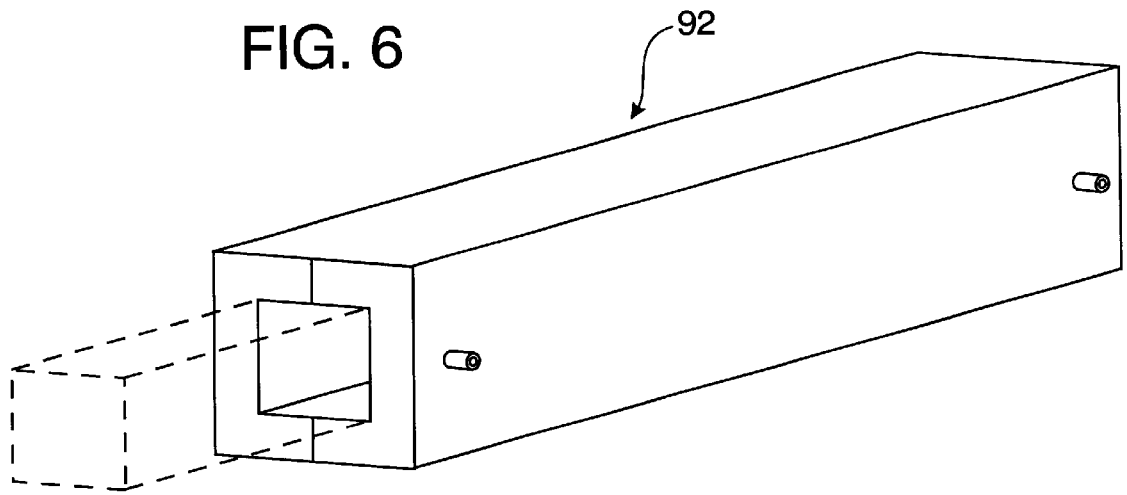
FIG. 6 is a cross-sectional view of the present invention, having a rectangular cross-section.
Figure 7:
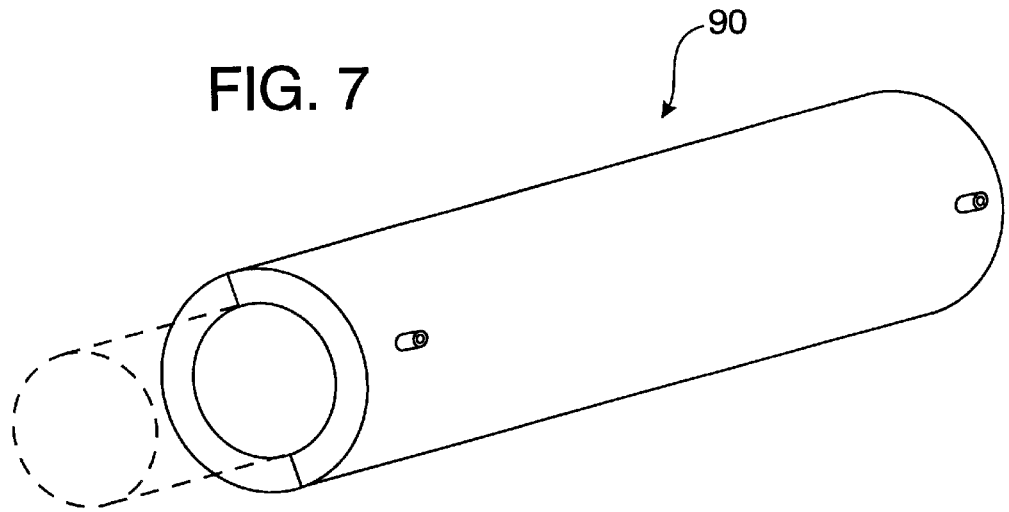
FIG. 7 is a perspective view of the present invention, having a circular cross-section.

Other embodiments of the present invention utilize a semi-circle configuration 90, as shown in FIG. 7, and a rectangular configuration 92, as shown in FIG. 6. These configurations would include the same internal heating and cooling elemental controls as set out previously.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An apparatus for controlling the temperature of plastic materials in a flowable state as it flows from a injection mold or extrusion apparatus through a barrel into a mold cavity or extrusion die and for insulating said barrel, said apparatus comprising:
    a vacuum cast ceramic fiber band having an exterior surface, an interior surface and having a thickness, wherein said interior surface is in communication with said outer surface of said barrel, wherein said band acts as an insulator for said barrel;
    at least one heating element and at least one cooling element, wherein said elements apply various temperatures to said barrel thereby controlling the temperature of said plastic materials flowing there through.

2. The apparatus of claim 1 wherein said vacuum cast ceramic fiber band is further defined as comprising a series of conduit blocks surrounding the perimeter of said barrel.

3. The apparatus of claim 2 wherein each of said series of blocks is defined as having an outer surface, a first side, a second side, a third side, a fourth side, an inner surface having a recess to house heating and cooling elements.

4. The apparatus of claim 1 wherein said cooling elements are further defined as utilizing air coolant.

5. An apparatus for controlling the temperature of plastic materials in a flowable state
    as it flows through a barrel, said apparatus comprising:
        a band in communication with the outer surface of said barrel and consisting of a plurality of inter-connected vacuum cast ceramic fiber conduit blocks with each block side, having an outer surface, a first side, a second side, a third side, a fourth side and an inner surface recess to house a temperature controlling means controlling the temperature of said flowable state plastic materials.

6. The apparatus of claim 5 wherein said apparatus is for insulating said barrel and wherein said band is comprised exclusively of ceramic blocks to act as an insulator for said barrel.

7. An apparatus for controlling the temperature of plastic materials in a flowable state as it flows through a barrel, said apparatus comprising:
    a band in communications with the outer surface of said barrel, said band having at least one temperature controlling means to control the temperature of said plastic materials flowing through said barrel,
    a plurality of conduit blocks, each block of said plurality having an exterior surface, an interior surface, a thickness, and a recessed area, wherein heating and cooling elements are imbedded within said recessed area wherein heating elements and cooling tube/tubes are imbedded in the block.

8. An apparatus for controlling the temperature of plastic materials in a flowable state as it flows through a barrel, said apparatus comprising:
    a band in communication with the outer surface of said barrel, said band consisting of a plurality of inter-connected vacuum cast conduit blocks with each of said blocks containing at least one temperature controlling means consisting of at least one heating element and at least one cooling element imbedded therein.

9. The apparatus of claim 5 wherein said apparatus controls the temperature of said plastic materials via radiation heating.

10. The apparatus of claim 7 wherein said apparatus controls the temperature of said plastic materials via radiation heating.

11. The apparatus of claim 8 wherein said apparatus controls the temperature of said plastic materials via radiation heating.

12. The apparatus of claim 5 wherein each of said inter-connected blocks is individually replaceable.

13. The apparatus of claim 7 wherein each of said inter-connected blocks is individually replaceable.

14. The apparatus of claim 8 wherein each of said inter-connected blocks is individually replaceable.

* * * * *